United States Patent [19]

Turnbo

[11] 3,857,869

[45] Dec. 31, 1974

[54] PROCESS FOR THE PREPARATION OF BIMETALLIC SALT COMPLEXES

[75] Inventor: Roy Glen Turnbo, Deer Park, Tex.

[73] Assignee: Tenneco Chemicals, Inc.,, Saddle Brook, N.J.

[22] Filed: Mar. 27, 1973

[21] Appl. No.: 345,438

[52] U.S. Cl............................ 260/438.1, 260/430
[51] Int. Cl............................................. C07f 1/08
[58] Field of Search........................ 260/438.1, 430

[56] References Cited
UNITED STATES PATENTS

| | | | |
|---|---|---|---|
| 2,953,589 | 9/1960 | McCaulay | 260/438.1 |
| 3,647,843 | 3/1972 | Walker et al. | 260/438.1 |
| 3,651,159 | 3/1972 | Long et al. | 260/438.1 X |

OTHER PUBLICATIONS

J.A.C.S, Vol. 85, pp. 4046–4047, (1963).
J.A.C.S., Vol. 88, p. 1877, (1966).
J.A.C.S., Vol. 88, p. 3243, (1966).
Chem. Abstracts, Vol. 28, p. 6119, 4,5, (1934).
Chem. Abstracts, Vol. 48, p. 5704i–5705a, (1954).
Chem. Abstracts, Vol. 54, p. 5427b, (1960).

Primary Examiner—H. Sneed
Attorney, Agent, or Firm—Evelyn Berlow

[57] ABSTRACT

Catalytically-inactive liquid sorbents that comprise bimetallic salt complexes having the generic formula $M_I \cdot M_{II} X_n \cdot$Aromatic, wherein $M_I$ is a Group I-B metal, $M_{II}$ is a Group III-A metal, X is halogen, $n$ is the sum of the valences of $M_I$ and $M_{II}$, and Aromatic is a monocyclic aromatic hydrocarbon having 6 to 12 carbon atoms are obtained by reacting a $M_I$ halide with at least an equivalent amount of a $M_{II}$ halide in an aromatic hydrocarbon to form a sorbent containing said bimetallic salt complex and maintaining said sorbent at a temperature between about 20°C. and the boiling point of the aromatic hydrocarbon while passing a stream of an inert gas through it until the gas leaving the sorbent contains neither $M_{II}$ halide or hydrogen halide.

7 Claims, No Drawings

PROCESS FOR THE PREPARATION OF BIMETALLIC SALT COMPLEXES

This invention relates to a process for the preparation of catalytically-inactive liquid sorbents that comprise bimetallic salt complexes having the generic formula $M_I M_{II} X_n \cdot$Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic hydrocarbon having 6 to 12 carbon atoms.

Bimetallic salt complexes that have the generic formula $M_I M_{II} X_n \cdot$Aromatic are known to be useful in the separation from gas mixtures of such complexible ligands as olefins, acetylenes, aromatics, and carbon monoxide. For example, in U.S. Pat. No. 3,651,159, Long et al. disclosed a process in which a sorbent solution of cuprous aluminum tetrahalide in toluene was used to separate ethylene, propylene, and other complexible ligands from a feed stream. The complexed ligands were recovered by ligand exchange with toluene. The resulting solution of cuprous aluminum tetrachloride·toluene in toluene was recycled and used to separate additional quantities of the complexible ligands from the feed stream. Walker et al. in U.S. Pat. No. 3,647,843 disclosed a process in which a hydrocarbon pyrolysis gas stream was contacted with a cuprous aluminum tetrachloride solution in toluene to separate acetylene from the gas stream as a solution of the complex HC≡CH·CuAlCl$_4$ in toluene. Acetylene was stripped from this complex, and the resulting cuprous aluminum tetrachloride·toluene complex was recycled.

It is known that unreacted $M_{II}$ halide in the bimetallic salt complex imparts strong Friedel-Crafts catalytic activity to the liquid sorbent. When aluminum chloride or another $M_{II}$ halide is present in the sorbent, the aromatic compound that is present undergoes alkylation and polymerization. When the aromatic compound is toluene, the polymer formed in the presence of aluminum chloride is believed to have the structural formula

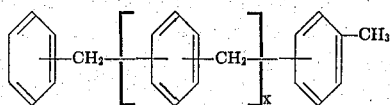

As sorbent containing free aluminum chloride is repeatedly recycled in processes such as those disclosed by Long et al. in U.S. Pat. No. 3,651,159 and by Walker et al. in U.S. Pat. No. 3,647,843, the amount of polymer in the sorbent increases until sufficient polymer is present to coat heat exchangers, clog lines, and otherwise foul the equipment.

Several procedures have been disclosed in the prior art for eliminating free $M_{II}$ halide, and particularly aluminum chloride, from the liquid sorbent and thereby inhibiting or neutralizing its catalytic activity, but none has proven to be entirely satisfactory. Long et al. in U.S. Pat. No. 3,651,159 teach that at least 1.01 moles, and preferably 1.02 to 1.2 moles, of the Group I-B metal salt should be used per mole of aluminum chloride in the preparation of the bimetallic salt and that the unreacted Group I-B metal salt should be removed from the sorbent solution by filtration. Even when a sizeable excess of the Group I-B metal salt is used, the sorbent prepared in this way often contains sufficient free aluminum chloride as well as the anion $(Al_2Cl_7)^-$ to impart substantial Friedel-Crafts catalytic activity to it. In U.S. Pat. No. 3,440,296, Walker disclosed a process in which at least an equivalent amount of a Group I-B metal halide is fused with an aluminum halide and the fused product is heated at 150°–200°C. until 3 percent to 7 percent of the aluminum halide has been removed from it. The resulting catalytically-inactive binary salt is then dissolved in an aromatic compound to form a complex. This process is difficult to carry out on a commercial scale without causing decomposition of the bimetallic salt.

In accordance with this invention, it has been found that catalytically-inactive liquid sorbents can be prepared by mixing and reacting an $M_I$ halide and and $M_{II}$ halide in a reaction medium that is an aromatic hydrocarbon to form a solution of the bimetallic salt complex $M_I M_{II} X_n \cdot$Aromatic in said aromatic hydrocarbon and maintaining said solution at a temperature between about 20°C. and the boiling point of the aromatic hydrocarbon while contacting it with an inert gas until the gas leaving the solution contains neither $M_{II}$ halide nor hydrogen halide. The resulting liquid sorbents have substantially no Friedel-Crafts catalytic activity. They can be used for long periods of time in processes such as those disclosed in U.S. Pat. Nos. 3,651,159 and 3,647,843 without the formation of appreciable amounts of polymer.

Any gas that does not react with the $M_I M_{II} X_n \cdot$Aromatic complex and that is not highly soluble in the aromatic hydrocarbon in which the bimetallic complex is dissolved can be used in the practice of this invention. Among the useful inert gases are methane, ethane, propane, hexane, heptane, cyclohexane, nitrogen, hydrogen, and carbon dioxide. Nitrogen is the preferred inert gas. The inert gas may be brought into contact with the liquid sorbent by methods that are well-known in the art. It is generally preferred to introduce a stream of the inert gas below the surface of the stirred sorbent and to allow the gas to bubble up through the sorbent. Alternatively, an inert compound that is liquid at ambient temperature, such as hexane, may be introduced below the surface of the sorbent and allowed to volatilize as the sorbent is heated. The rate at which the inert gas is introduced into the liquid sorbent and the amount of inert gas that is used are not critical provided that the flow of inert gas is continued until the gas leaving the sorbent contains neither $M_{II}$ halide nor hydrogen halide.

When the liquid sorbent is a solution of CuAlX$_4$·toluene in toluene, the process of this invention is preferably carried out by maintaining the sorbent at a temperature between 50°C. and 110°C. while passing nitrogen through it until the nitrogen leaving the sorbent contains neither aluminum halide nor hydrogen halide.

In addition to removing from the liquid sorbent the aluminum halide or other $M_{II}$ halide that imparts catalytic activity to it and thus promotes undesirable polymer formation, this process also removes from the sorbent any hydrogen halide that has been formed by hydrolysis of the $M_{II}$ halide. The removal of the hydrogen halide is necessary if corrosion of the equipment in which the sorbent is used is to be avoided.

The liquid sorbents that are used in the process of this invention are solutions of a bimetallic salt complex in an aromatic hydrocarbon. The bimetallic salt complexes have been defined herein as having the generic formula $M_IM_{II}X_n$.Aromatic. $M_I$ is a Group I-B metal; that is, copper, silver, or gold. Copper (I) is the preferred metal. $M_{II}$ is a Group III-A metal; that is, boron, aluminum, gallium, indium, or thallium. Boron and aluminum are the preferred metals, aluminum being particularly preferred. X is halogen, i.e., fluorine, chlorine, bromine, or iodine; it is preferably chlorine or bromine and $n$ is the sum of the valences of $M_I$ and $M_{II}$. Aromatic is a monocyclic aromatic hydrocarbon having 6 to 12 carbon atoms, and preferably 6 to 9 carbon atoms, such as benzene, toluene, ethylbenzene, xylene, or mesitylene. It is preferably toluene. Illustrative of these bimetallic salt complexes are the following: $CuBF_4$.benzene, $CuBCl_4$.benzene, $AgBF_4$.mesitylene, $AgBCl_4$.xylene, $AgAlCl_4$.xylene, $AgAlBr_4$.benzene, $CuGaCl_4$.toluene, $CuInI_4$.xylene $CuThI_4$.mesitylene, and the like. The preferred bimetallic salt complexes are $CuAlCl_4$.toluene and $CuAlBr_4$.toluene.

The aromatic hydrocarbon in which the bimetallic salt complex is dissolved is usually and preferably the same as the aromatic hydrocarbon used in the preparation of the bimetallic salt complex, but if desired it may be a different monocyclic aromatic hydrocarbon having 6 to 12 carbon atoms. The total amount of aromatic compound in the liquid sorbent, that is the amount in the bimetallic salt complex and the amount used as solvent, is at least 10 mole percent of the amount of the bimetallic salt $M_IM_{II}X_n$ that is present. It is preferred that the amount of aromatic hydrocarbon be 100 to 250 mole percent of the amount of the bimetallic salt.

The liquid sorbents that are rendered catalytically inactive by the process of this invention are prepared by mixing and reacting the appropriate metal halides in a reaction medium that is an aromatic hydrocarbon. Equivalent quantities of the $M_I$ halide and $M_{II}$ halide or a small excess of $M_{II}$ halide are generally used. It is preferred to use 1.01 moles to 1.20 moles of $M_{II}$ halide per mole of $M_I$ halide.

The invention is further illustrated by the following examples. In these examples, all parts are parts by weight and all percentages are percentages by weight.

EXAMPLE 1

A. To a reaction vessel equipped with a stirrer, steam jacket, and reflux condenser were added 180 parts of cuprous chloride, 242 parts of aluminum chloride, and 582 parts of dry toluene. The reaction mixture was stirred, and nitrogen was bubbled through it to remove any hydrogen chloride that had been formed by hydrolysis of the aluminum chloride. The temperature of the reaction mixture rose to about 75°C. as the bimetallic salt complex $CuAlCl_4$.toluene was formed. When the reaction had been completed as indicated by complete solution of the reactants, the reaction mixture was heated to its reflux temperature (110°C.) and maintained at that temperature while a stream of nitrogen was bubbled through it. The heating and nitrogen stripping were continued until the gas leaving the condenser contained neither hydrogen chloride nor aluminum chloride. The product was cooled to ambient temperature under a blanket of nitrogen.

B. An acetylene process off-gas that contained about 30 mole percent of carbon monoxide and 70 mole percent of hydrogen and methane was fed at ambient temperature and about 5 atmospheres pressure into an absorption column. On entering the column, the gas was contacted with an amount of liquid sorbent that was the product of Example 1A that contained at least sufficient cuprous aluminum tetrachloride to react with all of the carbon monoxide in the acetylene process off-gas. The carbon monoxide reacted with the liquid sorbent as it traveled through the column to form a solution of the carbon monoxide-cuprous aluminum tetrachloride complex in toluene. This solution was fed into a stripping column in which it was brought into contact with toluene vapor at 110°C. The mixture of toluene vapor and carbon monoxide that left the column was cooled to 25°C. to condense the toluene and to separate it from the carbon monoxide. The stripped sorbent was returned to the absorption column where it reacted with additional amounts of carbon monoxide.

At the start of the process the liquid sorbent contained 0.2 percent of polymer, based on the weight of toluene. After being used in the process for 41 days, its polymer content was 0.4 percent, based on the weight of toluene.

After the process using the sorbent whose preparation is described in Example 1A had been in operation for a year, the equipment was disassembled and inspected. A very thin film of an oil or light grease, which is believed to be a toluene polymer, was found on the walls of some of the piping.

EXAMPLE 2

A 1500 ml. sample of the liquid sorbent whose separation is described in Example 1A was placed in a three-necked flask equipped with a water condenser that was sealed with a mercury bubbler. Twelve small pieces of carbon steel pipe were placed in the flask. The contents of the flask were heated at 110°C. for one year. At the start of the heating period, some hydrogen chloride and aluminum volatilized out of the condenser and through the mercury bubbler.

After three months' heating, the liquid sorbent was unchanged in appearance. After having been heated at 110°C. for one year, the sorbent was still unchanged in appearance. The polymer content of the sorbent had increased from 0.3 percent to 3.4 percent, based on the weight of $CuAlCl_4$ in the sorbent. At the end of the heating period, the sorbent contained no elemental copper or other solids. The pieces of pipe had a copper coating, but they appeared to have undergone no other change.

COMPARATIVE EXAMPLE

Four 50 ml. samples of the liquid sorbent whose preparation is described in Example 1A were placed in glass ampoules. After evacuation of air from them, the ampoules were sealed and then immersed in a bath maintained at 110°C.

After three months' heating, the material in the ampoules had decomposed into two liquid phases, a black viscous tarry material and a lighter clear liquid.

Comparison of the results of the Comparative Example with those of Example 2 demonstrates that free aluminum chloride in the sealed ampoules caused extensive polymerization of the toluene in the liquid sorbent, whereas in the case of the refluxed solvent, aluminum chloride was volatilized out of the sorbent, thereby preventing alkylation and polymerization of the toluene.

What is claimed is:

1. The process of preparing a catalytically-inactive liquid sorbent comprising a bimetallic salt complex having the generic formula $M_IM_{II}X_n$.Aromatic, wherein $M_I$ is a Group I-B metal, $M_{II}$ is a Group III-A metal, X is halogen, n is the sum of the valences of $M_I$ and $M_{II}$, and Aromatic is a monocyclic aromatic hydrocarbon having 6 to 12 carbon atoms that comprises the steps of a. mixing and reacting an $M_I$ halide and an $M_{II}$ halide in a reaction medium that is an aromatic hydrocarbon having 6 to 12 carbon atoms to form a solution of the bimetallic salt complex $M_I M_{II} X_n$.Aromatic in said aromatic hydrocarbon, the total amount of aromatic hydrocarbon in said solution being at least 10 mole percent of the amount of the bimetallic salt $M_I M_{II} X_n$ that is present; and b. maintaining said solution at a temperature between about 20°C. and the boiling point of the aromatic hydrocarbon while contacting said solution with an inert gas until the gas leaving the solution contains neither $M_{II}$ halide nor hydrogen halide.

2. The process of claim 1 wherein in Step c) a stream of the inert gas is passed through said solution.

3. The process of claim 1 wherein the solution formed in Step a) is $CuAlCl_4$.toluene dissolved in toluene.

4. The process of claim 3 wherein in Step b) the solution is maintained at a temperature between 50°C. and 110°C.

5. The process of claim 1 wherein the inert gas used in Step c) is nitrogen.

6. The process of claim 1 wherein in Step a) 1.0 mole to 1.2 moles of $M_{II}$ halide is used per mole of $M_I$ halide.

7. The process of claim 1 wherein the total amount of aromatic hydrocarbon in the liquid sorbent formed in Step a) is 100 to 250 mole percent of the amount of the bimetallic salt $M_I M_{II} X_n$.

* * * * *